(12) United States Patent
Nakamura et al.

(10) Patent No.: US 6,335,903 B2
(45) Date of Patent: Jan. 1, 2002

(54) MEMORY SYSTEM

(75) Inventors: Tetsuhito Nakamura, Hachioji;
Naonobu Sukegawa, Inagi; Tsuguo Matsuura; Masanao Ito, both of Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/778,785

(22) Filed: Feb. 8, 2001

(30) Foreign Application Priority Data

Feb. 10, 2000 (JP) .......................................... 12-038168

(51) Int. Cl.[7] ................................................ G11C 8/00
(52) U.S. Cl. ...................................... 365/233; 365/239
(58) Field of Search .................................. 365/233, 239

(56) References Cited

U.S. PATENT DOCUMENTS

| | | | | |
|---|---|---|---|---|
| 4,680,701 A | * | 7/1987 | Cochran | 365/233 |
| 5,410,513 A | * | 4/1995 | Masuda et al. | 365/233 |
| 5,801,981 A | * | 9/1998 | Iwakiri | 365/233 |
| 6,000,016 A | * | 12/1999 | Curtis et al. | 365/233 |

FOREIGN PATENT DOCUMENTS

JP          7-210456       *  8/1995

* cited by examiner

*Primary Examiner*—Trong Phan
(74) *Attorney, Agent, or Firm*—Mattingly, Stanger & Malur, P.C.

(57) ABSTRACT

A memory system having a DRAM or synchronous DRAM as a memory unit. A memory controller which controls the memory unit in correspondence with a memory access request received from a memory access request generator, has a row address buffer for storing a row address extracted from an issued memory access request, avoiding registration of same row address into different positions, a pointer register for storing a pointer to a registration entry in the row address buffer holding the row address, correspondence detection circuit that detects whether or not row addresses of issued access requests correspond with each other by comparing stored pointers, and a memory unit control circuit which continuously issues column addresses of plural requests with row addresses corresponding with each other to the DRAM.

5 Claims, 8 Drawing Sheets

| INPUT | | | OUTPUT | | |
|---|---|---|---|---|---|
| L4 | L30 | L31 | L6 | L32 | L33 |
| 01 | 0 | 1 | 01 | 0 | 1 |
| 01 | 1 | 0 | 01 | 1 | 0 |
| 01 | 1 | 1 | 01 | 1 | 1 |
| 10 | 0 | 1 | 10 | 0 | 1 |
| 10 | 1 | 0 | 10 | 1 | 0 |
| 10 | 1 | 1 | 10 | 1 | 1 |
| 00 | 0 | 0 | 01 | 1 | 0 |
| 00 | 0 | 1 | 01 | 1 | 1 |
| 00 | 1 | 0 | 10 | 1 | 1 |

MEMORY SYSTEM

BACKGROUND OF THE INVENTION

1. Field of the Invention

The present invention relates to a memory system, and more particularly, to a memory system where a DRAM or synchronous DRAM is used as a storage device.

2. Description of Related Art

Conventionally, as a main storage of a supercomputer or a large-scale computer which must meet a requirement for high performance, an SRAM capable of high-speed operation is used. However, the SRAM is very expensive in comparison with other storage devices, and a huge mounting area is required in the integrated circuit. Accordingly, in accordance with heated cutthroat price competition and downsizing in recent years, it is desired to construct the main storage of supercomputer and the like with a cheaper and higher density DRAM. Then, in personal computers, use of DRAM or synchronous DRAM which is now becoming the main stream storage can be considered.

Addresses of DRAM and synchronous DRAM are divided into row addresses and column addresses. Data is read from or written into an arbitrary memory cell by first designating a row address then designating a column address after a predetermined waiting period. Further, in a case where designation of row address and column address are made with respect to a DRAM or synchronous DRAM, these designated addresses are transmitted via the same address line to the DRAM or synchronous DRAM. At this time, to discriminate the row address from the column address, a row address strobe signal is turned ON upon designation of row address, and a column address strobe signal is turned ON upon designation of column address.

Further, in the DRAM, when an initial row address has been designated, the contents of all the corresponding memory cells are stored into a temporary buffer. The buffer is released by a precharge command. Further, the precharge command may be issued at the same time of issuance of column address or may be issued independently. That is, for memory access requests having the same row address, column addresses can be continuously designated. In the supercomputer for which high-speed access is required and the like, this function must be fully utilized.

Japanese Published Patent Application No. Hei 07-210456 discloses a technique to improve utilization efficiency in a DRAM high-speed access mode. A row address to be currently issued to the DRAM is held in a first register, and a row address previously issued to the DRAM is held in a second register. Then a change of row address is detected by comparing the contents of the registers. If the high-speed access mode is not set although the row address has not changed, the ON period of row address strobe signal is increased. On the other hand, if the high-speed access mode is set although the row address has changed, the ON period of the row address strobe signal is reduced. As a result, in a case where memory access is repeated with respect to the same row address, the high-speed access mode is set for a long period, while in a case where the row address frequently changes, the high-speed access mode ends in a short period.

In the above-described conventional art, in a case where high-speed memory access is to be realized, a problem occurs when the comparison between row addresses must be quickly performed, since in application of this technique, the row address comparison must be completed before the issuance of column address. However, the speed of row address comparison tends to be slower by the increase in row address bits in accordance with recent mega-capacity storages.

SUMMARY OF THE INVENTION

Accordingly, an object of the present invention is to realize high-speed memory access by performing row address comparison at a high speed.

According to one aspect of the present invention, a memory system comprises means for extracting a row address part from an access address accompanying a memory access request, a buffer for storing the extracted row address, means for comparing the extracted row address with the row address stored in the buffer, a pointer register for storing a pointer to the buffer holding the row address, and a pointer buffer having a function of comparing stored pointers.

Further, the system comprises means for avoiding registration of the same row address within the buffer for storing row addresses, a control circuit which detects correspondence between row addresses between access requests from the result of comparison between stored pointers, and a control circuit which continuously issues column addresses in plural requests with row addresses corresponding to each other, to a DRAM or synchronous DRAM.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS (First Embodiment)

Figure 1:
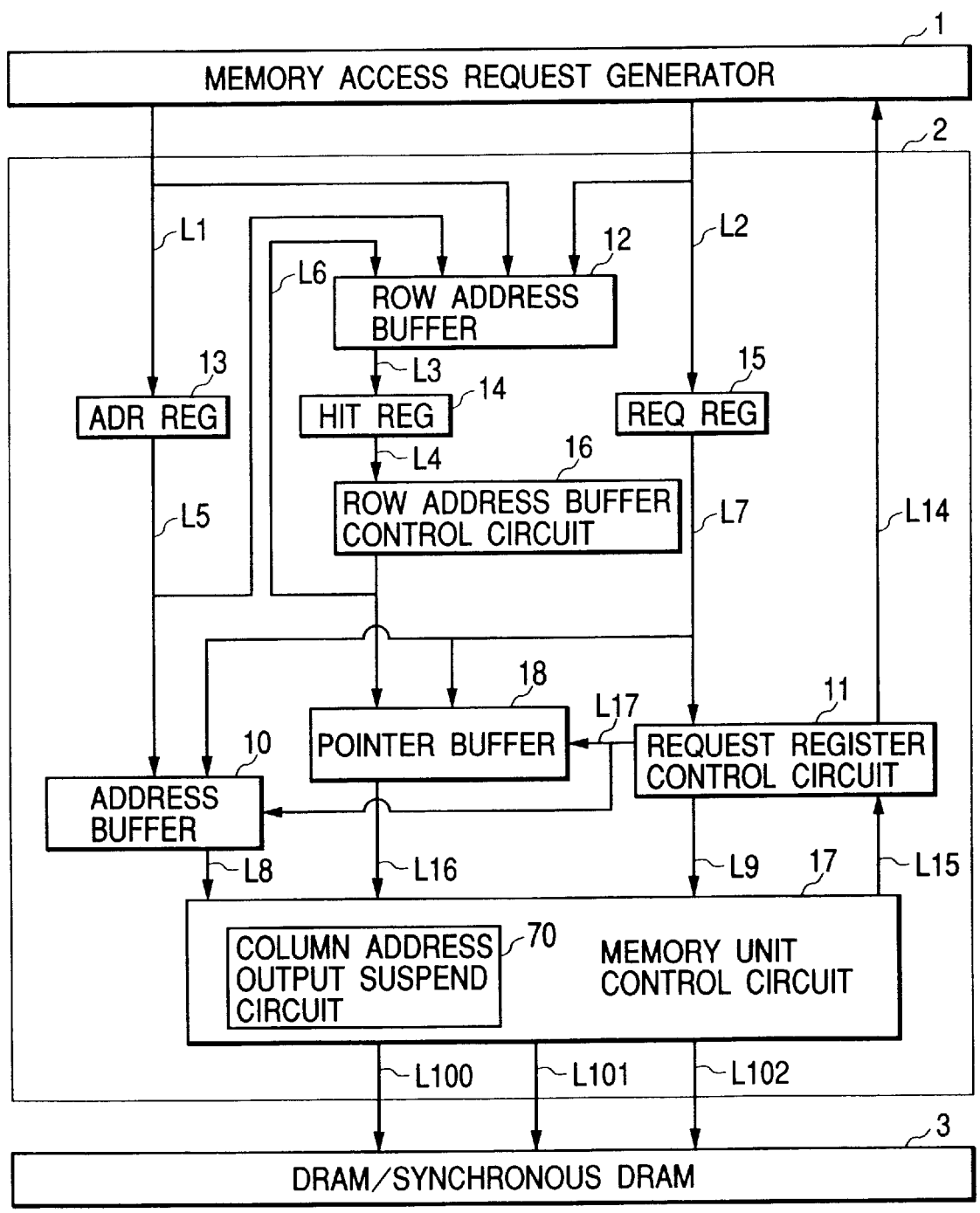
FIG. 1 is a block diagram showing a memory system according to a first embodiment of the present invention.

Preferred embodiments of the present invention will now be described in detail in accordance with the accompanying drawings. FIG. 1 is a block diagram showing a memory system according to a first embodiment of the present invention. In FIG. 1, reference numeral 1 denotes a memory access request generator; 2, a memory controller; 3, a DRAM or synchronous DRAM; 10, an address buffer; 11 a request register control circuit; 12, a row address buffer; 18, a pointer buffer; 13, an address register; 14, a hit register; 15, a request register; 16, a row address buffer control circuit; 17, a memory unit control circuit; 70, a column address output suspend circuit; and L1 to L102, signal lines.

In the present embodiment, the memory access request generator 1 and the DRAM 3 are respectively single devices, however, they may be respectively plural devices. Further, the memory access request generator 1 may be a processor or may be a crossbar network connected to the processor.

Next, the operation of the present system having the above construction will be described with reference to FIG. 1. The memory access request generator 1 transmits information on existence/absence of memory access request to the memory controller 2 via the signal line L2. If there is a memory access request, a signal "1" is transmitted onto the signal line L2, while if there is no memory access request, a signal "0" is transmitted onto the signal line L2. Further, the memory access request generator 1 transmits an address to the memory controller 2 via the signal line L1 at the same time of transmission of the memory access request onto the signal line L2. Further, the memory access request generator 1 manages entries in the pointer buffer 18 in the memory controller 2. If there is no available entry in the pointer buffer 18, the memory access request generator 1 does not issue a memory access request. The memory access request generator 1 manages the entries by counting the number of used entries from the difference between a memory access request issued by the generator itself and a pointer buffer release signal transmitted via the signal line L14.

The memory controller 2 first extracts a row address part from an address transmitted via the signal line L1 in the row address buffer 12. If a memory access request has been made, i.e., if the signal transmitted via the signal line L2 is "1", the memory controller compares the extracted row address part with a row address part stored in each entry of the row address buffer 12. As a result, if there is an entry holding a row address part corresponding to the extracted row address part, it transmits the entry number onto the signal line L3, while if there is no entry holding a row address part corresponding to the extracted row address part, transmits "0" onto the signal line L3. In the present embodiment, the entry number is represented in binary notation. That is, in a case where the row address corresponds with the first entry in the row address buffer 12, a signal "01" is transmitted via the signal line L3, and in a case where the row address corresponds with the second entry in the row address buffer 12, a signal "10" is transmitted via the signal line L3. In the present embodiment, the row address buffer 12 has two entries, however, the invention is applicable to address buffers having other numbers of entries as long as the number of entries is equal to or more than 1.

The address transmitted via the signal line L1, the memory access request transmitted via the signal line L2, and the result of row address comparison transmitted via the signal line L3 are held for one cycle respectively in the address register 13, the request register 15 and the hit register 14. The held address is outputted via the signal line L5, the held memory access request is outputted via the signal line L7, and the held result of comparison is outputted via the signal line L4. That is, as the relation between the signal lines L1 to L3 and the signal lines L4 to L7, the signal lines L1 to L3 are delayed by 1 cycle.

The row address buffer control circuit 16 manages the entries of the row address buffer 12. That is, the row address buffer control circuit has information (hereinbelow referred to as "valid") indicating whether or not a row address is already registered in each entry of the row address buffer 12. The row address buffer control circuit 16 transmits information on an entry of the address buffer 12 in which the row address part of the address transmitted on the signal line L5 is to be registered, to the row address buffer 12 via the signal line L6, based on the information and the signal of correspondence with the row address buffer transmitted via the signal line L4.

In the address buffer 10, the address transmitted via the signal line L5 is registered into an entry designated via the signal line L17 by the request register control circuit 11, in accordance with the memory access request. That is, when a registration request (signal "1") is transmitted from the signal line L7, the address transmitted via the signal line L5 is registered into the first entry if the signal line L17 designates the entry number 1 (signal "01"), or registered into the second entry if the signal line L17 designates the entry number 2. In the present embodiment, the address buffer 10 has two entries (if the number of entries is more than 1, the present method can be applied). Further, the address is transmitted from the address buffer 10 to the memory unit control circuit 17 via the signal line L8 in synchronization with the memory access request transmitted from the request register 15 via the signal line L7.

The request register control circuit 11 manages entries of the address buffer 10 and the pointer buffer 18. When a memory access request is transmitted via the signal line L7, the request register control circuit 11 transmits information on registers in which the address and the pointer are to be registered, to the address buffer 10 and the pointer buffer 18 via the signal line L17. Further, the request register control circuit 11 transmits the memory access request to the memory unit control circuit 17 via the signal line L9. The request register control circuit 11 manages resource information in the memory unit control circuit 17 which is the difference between the memory access request signal issued by the request register control circuit 11 via the signal line L9 and a pointer buffer release signal from the memory unit control circuit 17 via the signal line L15. If there is available space in the resource in the memory unit control circuit 17, the request register control circuit 11 transmits the memory access request (signal "1") via the signal line L9, and at the same time, transmits a signal "1" as a request buffer release signal to the memory access request generator 1 via the signal line L14.

The number of pointer registers of the pointer buffer 18 is equal to or more than the number of entries of the address buffer 10. In the present embodiment, the number of pointer registers is the same as that of the entries of the address buffer. In the pointer buffer 18, when the memory access request (signal "1") is transmitted via the signal line L7, the entry number transmitted via the signal line L6 is registered into a pointer register designated by the signal line L17. That is, the pointer register of the pointer buffer 18 holds a registration entry number in the row address buffer holding the row address part. Further, in the pointer buffer 18, information on whether or not the row address part of the address transmitted via the signal line L8 corresponds with the row address part of the address previously issued from the address buffer 10 is transmitted to the memory unit control circuit 17 via the signal line L16. If they correspond with each other, a signal "1" is transmitted onto the signal line L16, while if they do not correspond, a signal "0" is transmitted onto the signal line L16.

The memory unit control circuit 17 issues commands necessary for its control via signal lines L100 to L102 to the DRAM or synchronous DRAM. The operation of the memory unit control circuit 17 in a case where the memory device to be controlled is a DRAM is different from that in a case where the memory device is a synchronous DRAM. In the present embodiment, the operation of the memory unit control circuit 17 in a case where the memory device is a synchronous DRAM will be described. The signal line L100 indicates a row address strobe signal, and the signal line L101, a column address strobe signal. If the row address strobe signal indicated by the signal line L100 is a signal "1", a row address is transmitted onto the signal line L102, while if the row address strobe signal indicated by the signal line L101 is a signal "1", a column address is transmitted onto the signal line L102.

In the initial state of the memory unit control circuit 17 (in a state where no memory access request remains in the memory unit control circuit 17), if a memory access request (signal "1") is transmitted via the signal line L9, the memory unit control circuit 17 defines the memory access request as a head request. The memory unit control circuit 17 transmits a row address part of address of the head request transmitted via the signal line L8 to the DRAM via the signal line L102 and sets the signal line L100 to indicate issuance of row address (signal "1"). Further, after a waiting period defined by the DRAM specification, the memory unit control circuit 17 transmits a column address of the head request to the DRAM via the signal line L102, sets the signal line L101 to indicate issuance of column address (signal "1"), and transmits a release signal for a buffer storing the head request via the signal line L15.

Further, in a state where the memory unit control circuit 17 that has issued the row address of the head request is waiting for issuance of column address, if a memory access request is transmitted via the signal line L9, two cases as described below are considered.

In one case, the signal line L16 indicates correspondence with the row address part of the address of the previously-issued memory access request (signal "1"). In this case, after issuance of the column address of the head request, the memory unit control circuit 17 transmits the column address part of the address transmitted via the signal line L8 to the DRAM via the signal line L102 in the next row address issuance cycle, and sets the signal line L101 to indicate issuance of column address (signal "1"), but does not issue a precharge command. Further, the memory unit control circuit 17 transmits a release signal for a buffer holding the request to the request register control circuit 11 via the signal line L15. In the other case, the signal line L16 indicates non-correspondence with the row address part of the address in the previously issued memory access request (signal "0"). In this case, the memory unit control circuit 17 defines the latter memory access request as a head request. The memory unit control circuit 17 transmits the column address part of the address in the head request transmitted via the signal line L8 in the next cycle of the issuance of the row address of the head request via the signal line L102, sets the signal line L100 to indicate issuance of row address, and issues a precharge command. Further, the memory unit control circuit 17 waits in a period determined by the DRAM specification, then transmits the column address part of the address in the head request to the DRAM via the signal line L102, sets the signal line L101 to indicate issuance of column address, and transmits a release signal for the buffer holding the head request to the request register control circuit 11 via the signal line L15.

The precharge command is represented as a part of the address transmitted onto the signal line L102 upon issuance of column address. If the signal line L101 indicative of column address strobe signal is "1" and a part of the signal line L102 indicative of address is "1", precharge operation is performed, with registration of row address, in the DRAM. If the signal line L101 indicative of column address strobe signal is "1" and the part of the signal line L102 indicative of address is "0", only the registration of row address is performed, without precharge operation, in the DRAM. The operation of the memory unit control circuit 17 in use of synchronous DRAM is as described above.

Further, the memory unit control circuit 17 has a column address output suspend circuit 70. The column address output suspend circuit 70 starts its operation in accordance with an internal counter or an input from the outside. For example, when a value of the internal counter becomes a predetermined value, a precharge command is issued upon registration of column address even if it is detected in the pointer buffer 18 that a row address of previously issued memory access request corresponds with that of a new memory access request, i.e., the signal line L16 indicates a signal "1". That is, high-speed access by continuous issuance of different column addresses under the same row address is temporarily suspended. This mechanism is effective to prevent handling memory accesses with a major row address with a higher priority than other memory accesses with minor row addresses. On the other hand, the construction to start the column address output suspend circuit 70 in accordance with signal input from the outside is employed, for example, for temporary continuous issuance of column addresses upon DRAM refreshing operation.

In use of DRAM, the continuous issuance of column addresses is similarly performed in case of the synchronous DRAM except that the row address strobe signal indicated by the signal line L100 is maintained "1" while the row address is held in the DRAM.

Figure 2:
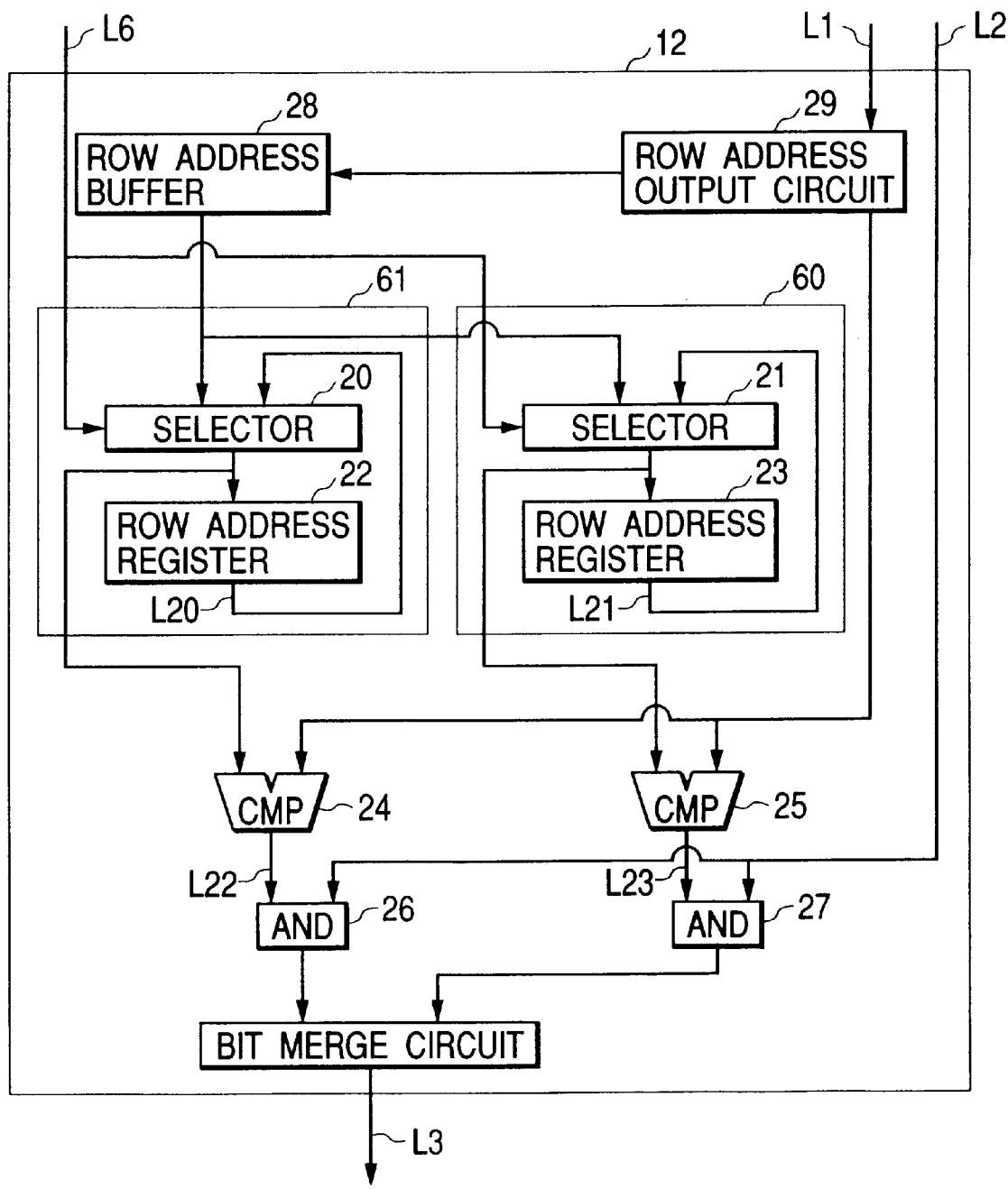
FIG. 2 is a block diagram showing a row address buffer in the memory system according to the embodiment.

Next, the processing in the row address buffer 12 will be described in detail with reference to FIG. 2. In FIG. 2, numerals 20 and 21 denote selectors; 22 and 23, row address registers; 24 and 25, comparators; 26 and 27, AND gates; 28 and 29, row address output circuits; 60 and 61, row address buffer entries; and L20 to L23, signal lines.

The row address output circuits 28 and 29 extract row address parts from addresses transmitted via the signal lines L5 and L1. In the present embodiment, the row address buffer 12 has two entries. In the row address buffer, the first entry is the row address buffer entry 60, and the second entry is the row address buffer entry 61.

The selector 21 in the row address buffer entry 60 selects an output from a row address register 23 if a signal transmitted via the signal line L6 indicates the first entry of the row address buffer, while if the signal indicates the other entry, selects a row address held in the row address register 22. The selector 20 in the row address buffer entry 61 selects an output from a row address register 22 if the signal transmitted via the signal line L6 indicates the second entry of the row address buffer, while if the signal indicates the other entry, selects a row address held in the row address register 23.

The row address register 22 in the row address buffer entry 61 comprises a flip-flop which holds the row address outputted from the selector 20 for one cycle. Also, the row address register 23 comprises a flip-flop which holds the row address outputted from the selector 21 for one cycle.

The comparator 24 compares the row address outputted from the selector 20 with the row address extracted by the row address output circuit 29, and if they correspond with each other, outputs a signal "1", otherwise, outputs a signal "0". The comparator 25 compares the row address outputted from the selector 21 with the row address extracted by the row address output circuit 29, and if they correspond with each other, outputs a signal "1", otherwise, outputs a signal "0".

The AND gate 26 performs logical conjunction operation between the output from the comparator 24 and a signal transmitted via the signal line L2. The AND gate 27 performs logical conjunction operation between the output from the comparator 26 and the signal transmitted via the signal line L2. If the output from the AND gate 26 is a signal "0"and the output from the AND gate 27 is a signal "0", a signal "00" is transmitted onto the signal line L3. If the output from the AND gate 26 is a signal "0" and the output from the AND gate 27 is a signal "1", a signal "10" is transmitted onto the signal line L3. If the output from the AND gate 26 is a signal "1" and the output from the AND gate 27 is a signal "0", a signal "01" is transmitted onto the signal line L3. That is, if the first entry of the row address buffer corresponds with the row address extracted by the row address output circuit 29, the entry number, 1, is transmitted in binary representation onto the signal line L3. If the second entry of the row address buffer corresponds with the row address extracted by the row address output circuit 29, the entry number, 2, is transmitted in binary representation onto the signal line L3.

Figures 3, 4:
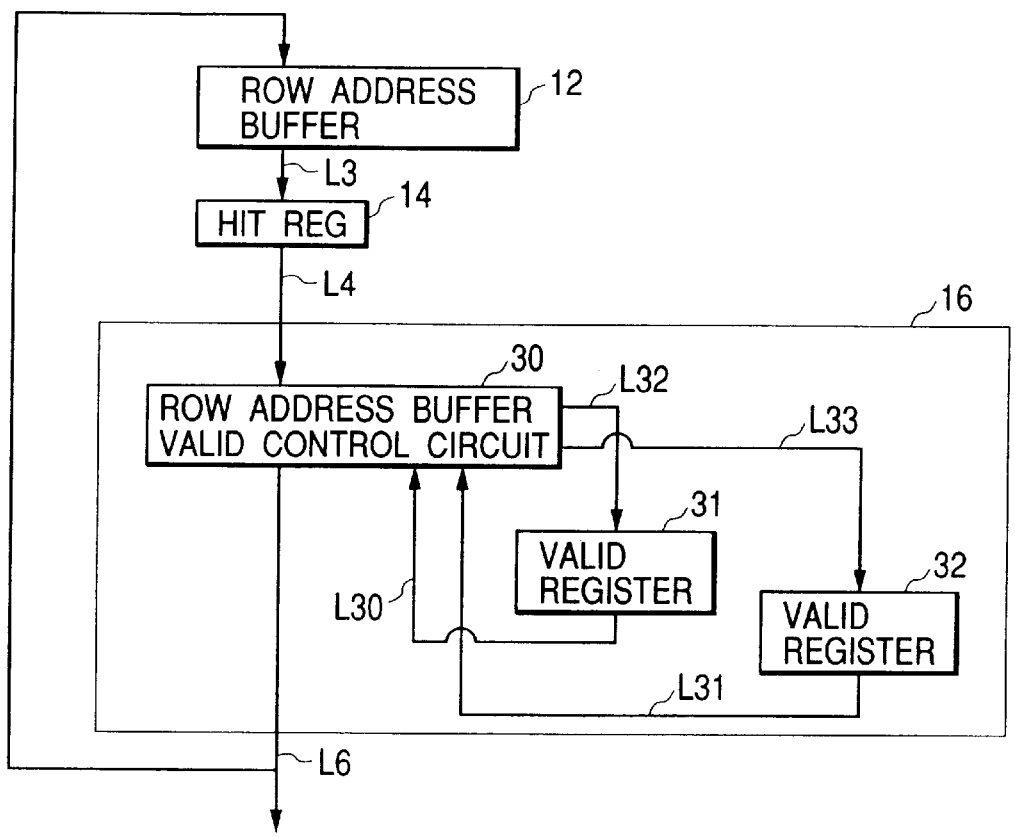
FIG. 3 is a block diagram showing the construction of the row address buffer in the memory system according to the embodiment.
FIG. 4 is a truth table showing operations related to row-address buffer valid control in the memory system according to the embodiment.

Hereinbelow, the processing in the row address buffer control circuit 16 will be described in detail with reference to FIGS. 3 and 4. In FIG. 3, numeral 30 denotes a row address buffer valid control circuit; 31 and 32, valid registers; and L30 to L33, signal lines.

The row address buffer valid control circuit 30 transmits information on an entry of the row address buffer 12, in which the row address part of the address transmitted onto the signal line L5 is to be registered, to the row address buffer 12 via the signal line L6, in accordance with a signal indicative of correspondence with the row address buffer transmitted via the signal line L4 and statuses of use of the entries of the row address buffer indicated by the valid registers 31 and 32. If the signal on the signal line L4 indicates correspondence with the row address buffer, the row address buffer valid control circuit 30 transmits the signal on the signal line L4 to the signal line L6 and does not change the contents of the respective valid registers. If the signal on the signal line L4 does not indicate the correspondence with the row address buffer, the row address buffer valid control circuit 30 transmits a minimum entry number among available entries onto the signal line L6. FIG. 4 is a truth table showing the detailed operations of the row address buffer valid control circuit 30.

The valid register 31 comprises a flip-flop which holds a signal indicated by the signal line L32 for 1 cycle and outputs it onto the signal line L30. The valid register 31 indicates the status of use of the first entry of the row address buffer. If an output signal from the valid register 31 is "1", a row address is already registered in the first entry of the row address buffer, while if the output signal is "0", a row address is not registered in the first entry. Also the valid register 32 comprises a flip-flop which holds a signal indicated by the signal line L33 for 1 cycle and outputs it onto the signal line L31. The valid register 32 indicates the status of use of the second entry of the row address buffer. That is, if an output signal from the valid register 32 is "1", a row address is already registered in the second entry of the row address buffer, while if the output signal is "0", the second entry of the row address buffer is available.

Figure 5:
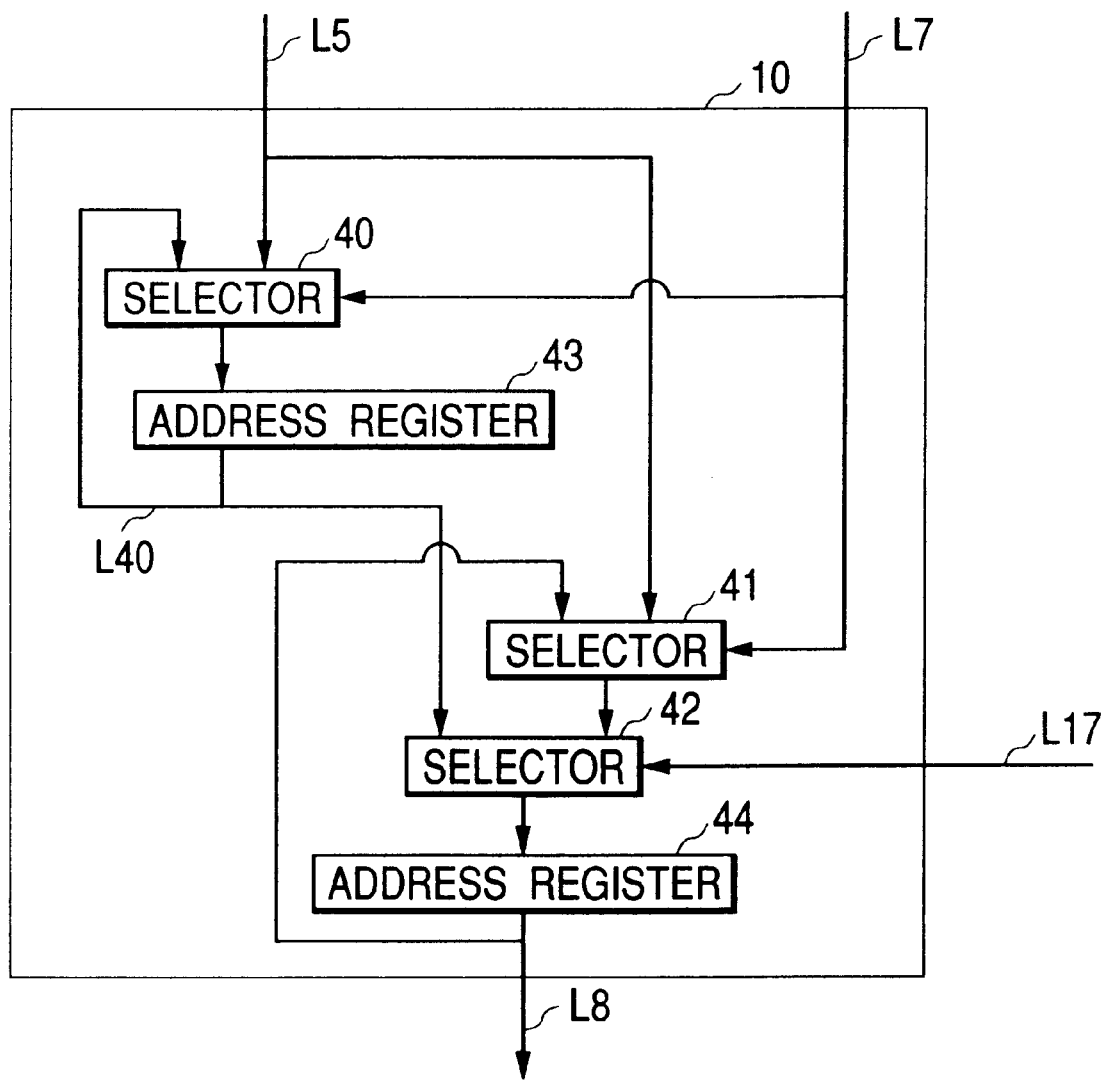
FIG. 5 is a block diagram showing the construction of an address buffer in the memory system according to the embodiment.

Hereinbelow, the processing in the address buffer 10 will be described in detail with reference to FIG. 5. In FIG. 5, numerals 40 to 42 denote selectors; 43 and 44, address registers; and L40, a signal line. A signal on the signal line L7 is also a signal designating whether or not the address transmitted via the signal line L5 is to be registered into the address register. If the signal line L7 indicates registration of address into the address register (signal "1"), the address is registered into an address register designated by a signal line L17. If the signal line L7 does not indicate the registration of address into the address register (signal "0"), the address is not registered in any of the address registers. In the present embodiment, an address register number of the address register 43 is 1, and that of the address register 44, 2.

If the signal line L7 indicates memory access request, the selector 40 outputs the address transmitted via the signal line L5, while if the signal line L7 indicates absence of memory access request, outputs an output from the address register 43 transmitted via the signal line L40. If the signal line L7 indicates memory access request, the selector 41 outputs the address transmitted via the signal line L5, while if the signal line L7 indicates absence of memory access request, outputs an output from the address register 44 transmitted via the signal line L8.

If the signal line L17 designates the second entry (signal "10"), the selector 42 outputs the output from the selector 41, while if the signal line L17 designates the first entry (signal "01"), outputs the output from the address register 43 transmitted via the signal line L40.

The address register 43 comprises a flip-flop which holds the output from the selector 40 for 1 cycle and outputs it onto the signal line L40. The address register 44 comprises a flip-flop which holds the output from the selector 42 for 1 cycle and outputs it onto the signal line L8.

Figure 6:
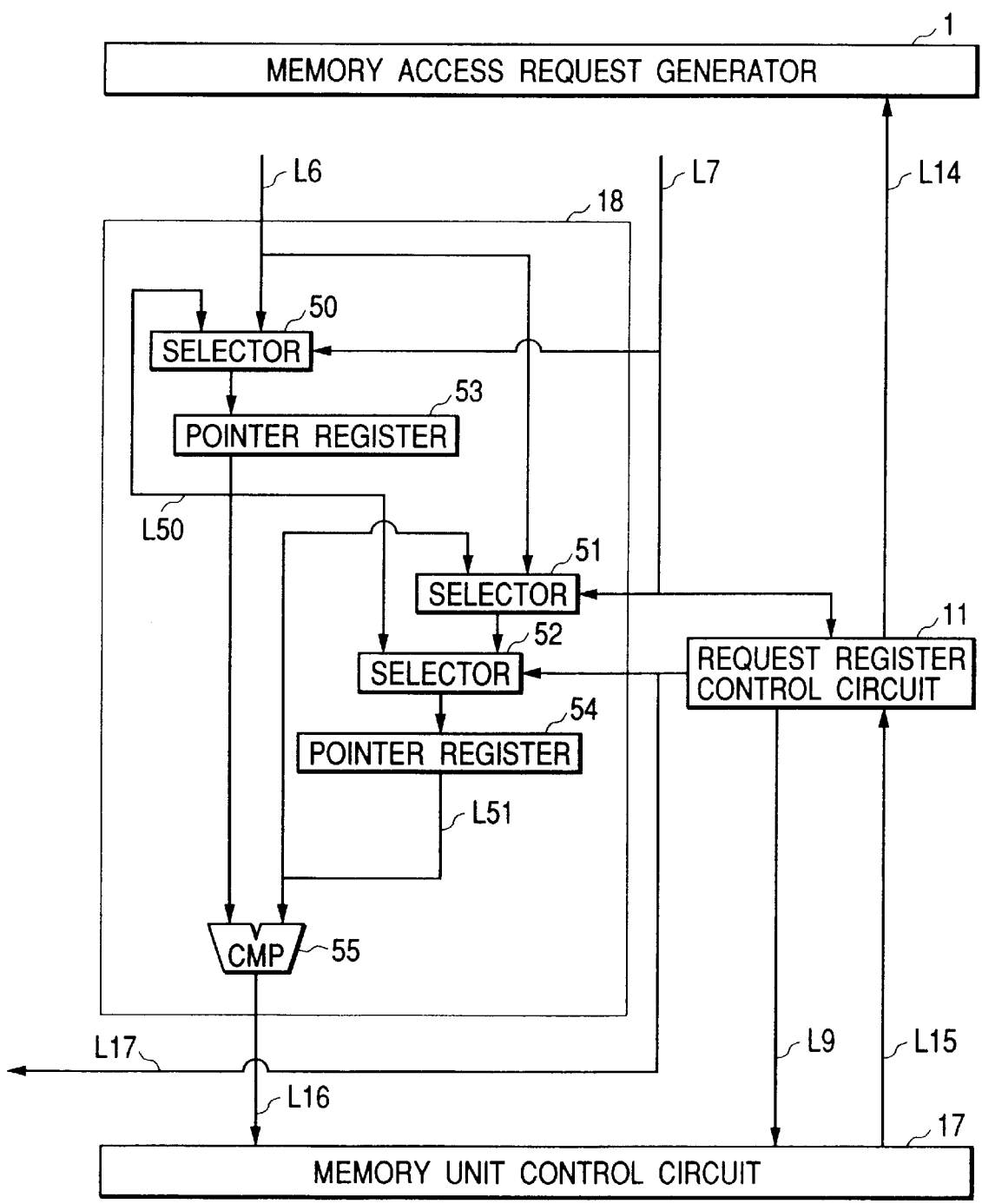
FIG. 6 is a block diagram showing the construction of a pointer buffer in the memory system according to the embodiment.

Hereinbelow, the processing in the pointer buffer 18 will be described in detail with reference to FIG. 6. In FIG. 6, numerals 50 to 52 denote selectors; 53 and 54, pointer registers; 55, a comparator; 11, the request register control circuit; and L50 and L51, signal lines. The signal line L7 is also a signal line indicating whether or not a pointer transmitted via the signal line L6 is to be registered into the pointer register. If the signal line L7 indicates a pointer register registration request (signal "1"), the pointer is registered into the pointer register 53 or the pointer register 54 in the pointer buffer 18. If the signal line L7 does not indicate pointer register registration (signal "0"), the pointer is not registered into any of the pointer registers. A pointer register in which the pointer is to be registered is designated by the signal line L17. If the signal line L17 indicates the first entry (signal "01"), the pointer is registered into the pointer register 53, while if the signal line L17 indicates the second entry (signal "10"), the pointer is registered into the pointer register 54.

If the signal line L7 indicates the pointer register registration request (signal "1"), the selector 50 outputs the pointer transmitted via the signal line L6, while if the signal line L7 does not indicate pointer register registration (signal "0"), outputs an output from the pointer register 53 transmitted via the signal line L50. If the signal line L7 indicates the pointer register registration request, the selector 51 outputs the pointer transmitted via the signal line L6, while if the signal line L7 does not indicate pointer register registration, outputs an output from the pointer register 54 transmitted via the signal line L51.

If the signal line L17 designates the second entry (signal "10"), the selector 52 outputs the output from the selector 51, while if the signal line L17 designates the first entry (signal "01"), outputs the output from the pointer register 53 transmitted via the signal line L50.

The pointer register 53 comprises a flip-flop which holds the output from the selector 50 for 1 cycle and outputs it onto the signal line L50. The pointer register 54 comprises a flip-flop which holds the output from the selector 52 for 1 cycle and outputs it onto the signal line L51. If the pointers indicated by the signal lines L50 and L51 correspond with each other, the comparator 55 outputs a signal "1", otherwise, outputs a signal "0", onto the signal line L16.

(Second Embodiment)

Figure 7:
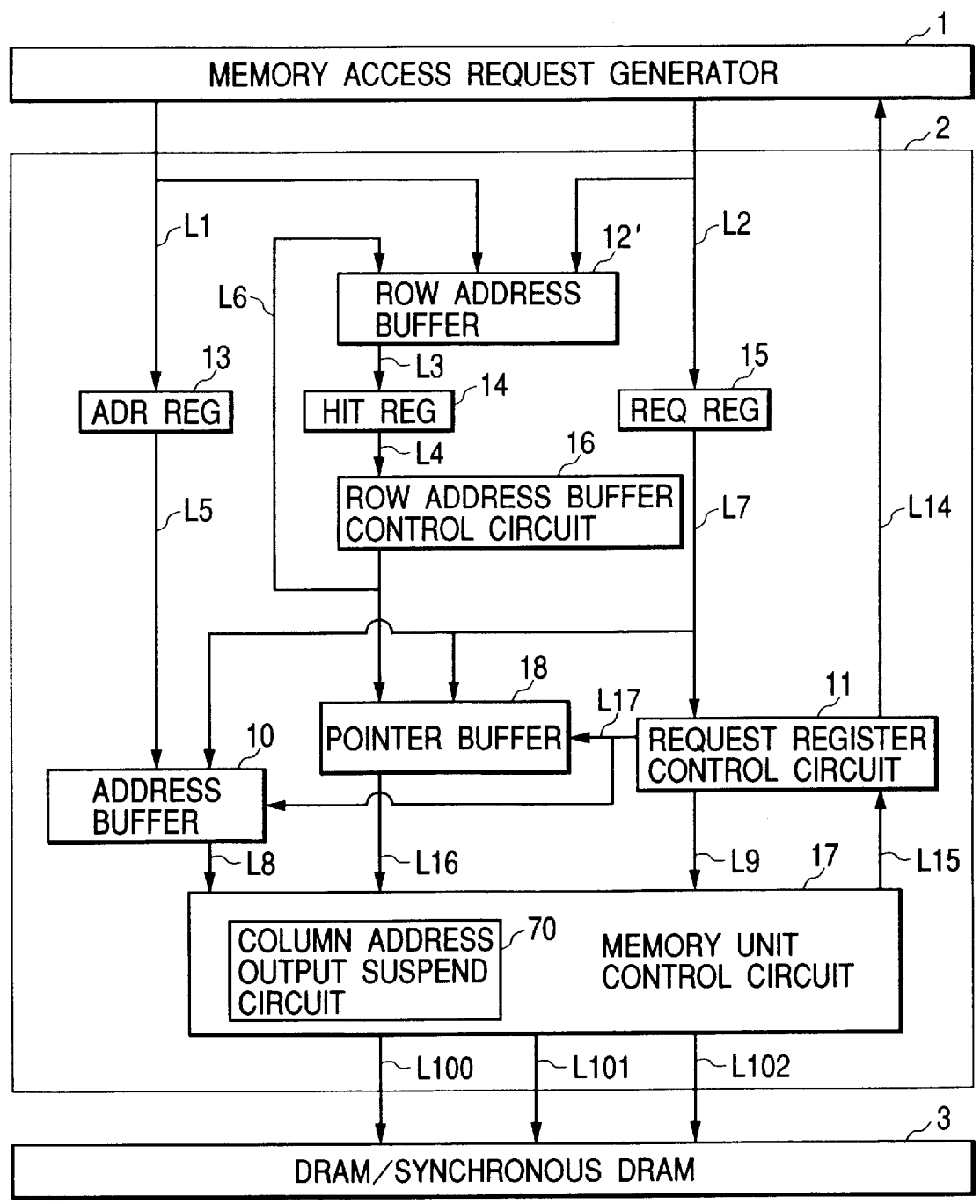
FIG. 7 is a block diagram showing the construction of the memory system according to another embodiment of the present invention.
Figure 8:
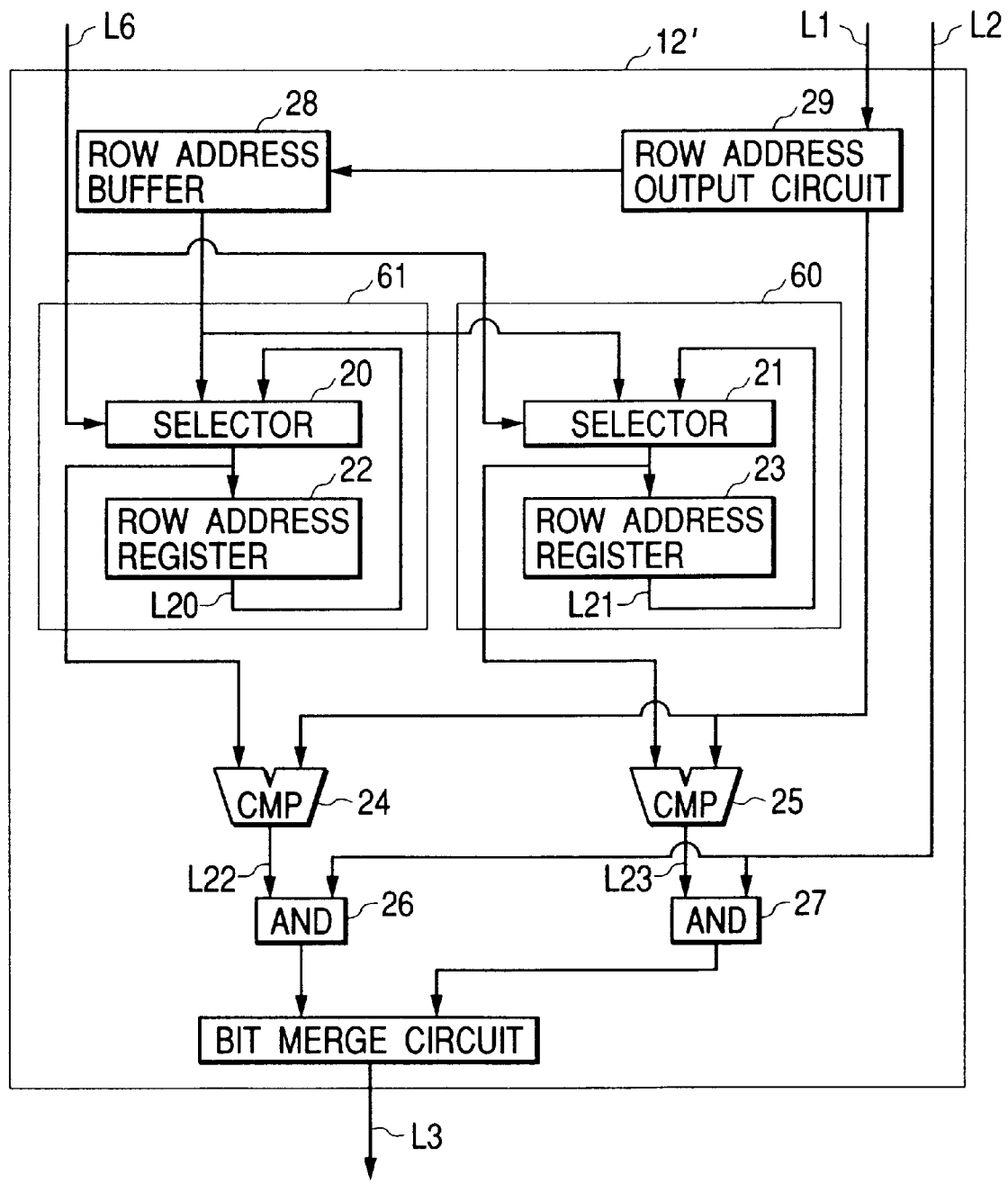
FIG. 8 is a block diagram showing the construction of the row address buffer of the memory system according to the other embodiment.

A second embodiment of the present invention will be described. In the first embodiment, the inputs into the row address buffer 12 are signal lines L1, L2, L5 and L6. The signal line L1 indicates a current request address, and the signal line L5, a 1-cycle previous request address. The respective addresses are decomposed in the row address buffer 12 and address parts are extracted. However, as the signal line L5 indicates an address obtained by delaying the signal L1 by 1 cycle in the address register 13, the same result can be obtained by delaying the row address obtained by the row address output circuit 29 from the address of the signal line L1 instead of decomposing the signal L5 in the row address buffer 12. That is, in the second embodiment shown in FIGS. 7 and 8, only the signal line L1 is connected to the row address buffer 12, as shown in FIG. 7, different from the first embodiment where the same address is inputted into the row address buffer via the signal lines L1 and L5. The row address buffer 12 has a circuit construction as shown in FIG. 8, in which the row address output circuit 28 in FIG. 2 is replaced with a row address register 28 connected to the output of the row address output circuit 29, thereby the extraction of row address is made once. The other parts have the same constructions in the first embodiment.

(Third Embodiment)

Figure 9:
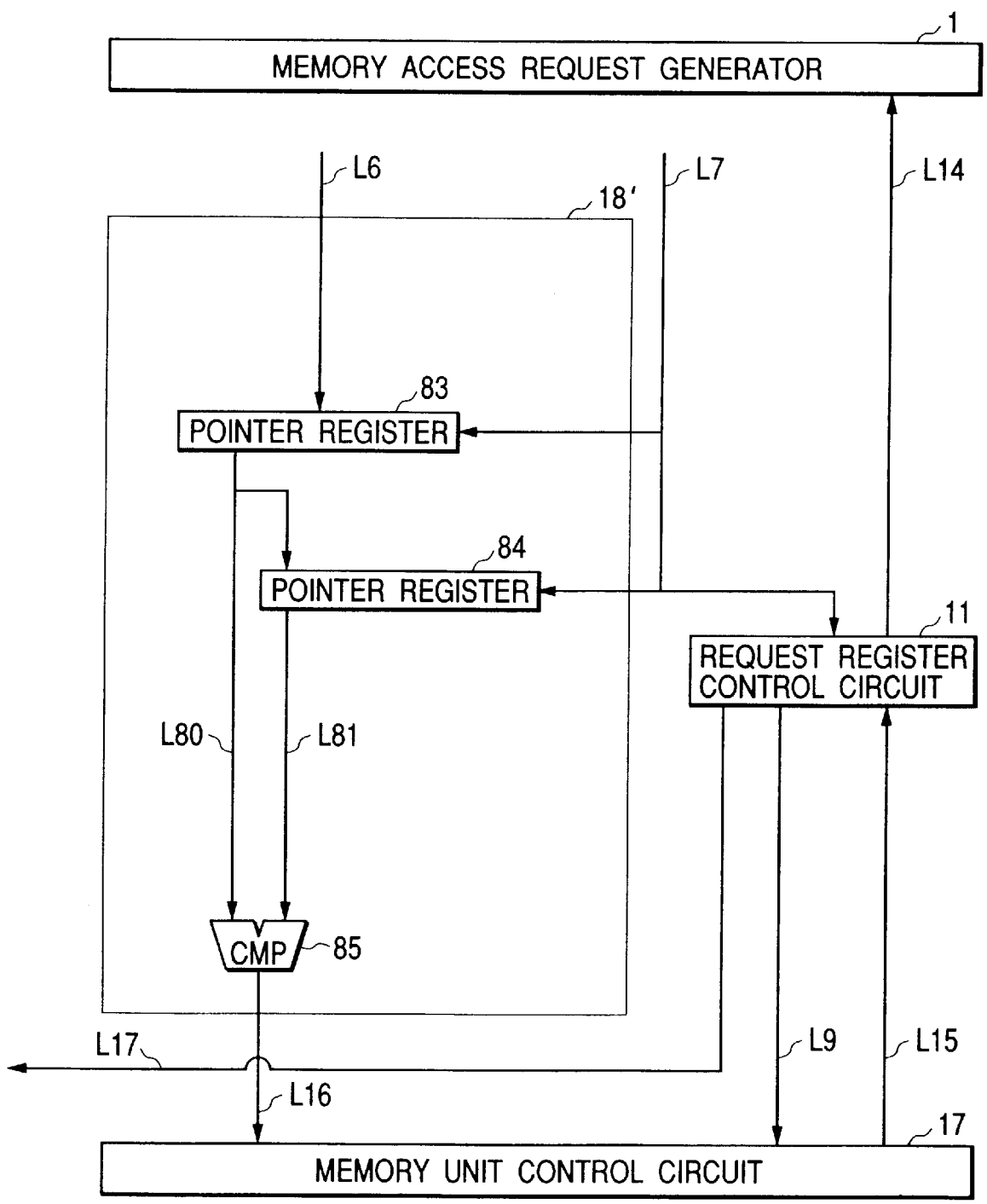
FIG. 9 is a block diagram showing the construction of the pointer buffer in the memory system according to another embodiment of the present invention.

In the first and second embodiments, the pointer buffer 18 is constructed such that it can be extended in case of two or more pointer registers. In a case where the number of pointer registers is two, as a part indicative of pointer register in which pointer registration is to be made is unnecessary in the pointer buffer 18, the pointer buffer 18 as shown in FIG. 9 may be employed. In FIG. 9, when a memory access request (signal "1") is transmitted via the signal line L7, the entry number transmitted via the signal line L6 is sent to a comparator 85 and registered in a pointer register 83, and the content of pointer register 84 is sent to a comparator 85, in which the pointers are compared with each other. Further, the result of comparison is transmitted to the memory unit control circuit 17 via the signal line L16. If the pointers correspond with each other, a signal "1" is transmitted onto the signal line L16, while if they do not correspond with each other, a signal "0" is transmitted onto the signal line L16.

According to the above embodiment, it is detected whether or not row addresses of time-sequentially issued memory access requests correspond with each other by comparison between pointers to the row address buffers instead of comparison between all the bits of the row addresses. The current mainstream size of DRAM row address is ten and several bits and it is expected to increase in the future. The number of bits of pointer to the row address buffer is represented as a logarithm with the number of entries of the row address buffer, 2, as the base, and generally, the number of bits of the pointer is very small in comparison with the number of bits of the DRAM row address. For example, in case of current mainstream 256-megabit DRAM, the row address generally has 13 bits, whereas the pointer to the row address buffer, when having 16 entries, has 4 bits.

Accordingly, the speed of comparison is very high in comparison with that between all the bits of row addresses, thus high-speed memory access can be realized.

Further, an address buffer preceding the memory unit control circuit is provided, and control positively utilizing the result of comparison between pointer buffers instead of First-In-First-Out control is applied to the address buffer, so that a row address outputted from the address buffer can continue as long as possible. By this arrangement, the data bath between the memory and the memory control circuit can be more effectively used.

The present invention is not limited to the above embodiments and various changes and modifications can be made within the spirit and scope of the present invention.

Therefore, to appraise the public of the scope of the present invention, the following claims are made.

What is claimed is:

1. A memory system comprising:
   a memory unit accessed by sequential designation of row address and column address;
   a memory access request generator for issuing a memory access request to said memory unit; and
   a memory controller for controlling said memory unit in accordance with the memory access request issued from said memory access request generator,
   wherein said memory controller includes:
   a row address buffer for storing a row address, extracted from the memory access request issued from said memory access request generator, avoiding registration of the same row address into different positions;
   a pointer register for storing a pointer to a registration entry in said row address buffer holding said row address;
   a correspondence detection circuit for comparing a previously stored pointer with a newly stored pointer in said pointer register and detecting whether or not row addresses of plural memory access requests correspond with each other; and
   a memory unit control circuit for continuously issuing memory access requests with row addresses corresponding to each other to said memory unit.

2. The memory system according to claim 1, wherein said memory unit comprises a DRAM.

3. The memory system according to claim 1, wherein said memory unit comprises a synchronous DRAM.

4. The memory system according to claim 1, wherein said memory unit control circuit has a circuit for rearranging an order of simultaneously executable requests issued from said memory access request generator into an order of improved memory access speed and issuing the memory access requests to said memory unit.

5. The memory system according to claim 1, wherein said memory unit control circuit further has means for suspending continuous issuance of plural memory access requests with row addresses corresponding to each other, in accordance with an input of external signal, or if a value of internal counter reaches a predetermined number.

* * * * *